US011054882B2

(12) United States Patent
Becker

(10) Patent No.: US 11,054,882 B2
(45) Date of Patent: Jul. 6, 2021

(54) EXTERNALLY-TRIGGERED THROTTLING

(71) Applicant: Apple Inc., Cupertino, CA (US)

(72) Inventor: Daniel U. Becker, San Jose, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 16/281,283

(22) Filed: Feb. 21, 2019

(65) Prior Publication Data

US 2020/0272217 A1 Aug. 27, 2020

(51) Int. Cl.
| G06F 1/3234 | (2019.01) |
| G06F 1/3203 | (2019.01) |
| G06F 1/3206 | (2019.01) |
| G06F 7/58 | (2006.01) |

(52) U.S. Cl.
CPC .......... *G06F 1/3234* (2013.01); *G06F 1/3203* (2013.01); *G06F 1/3206* (2013.01); *G06F 7/584* (2013.01)

(58) Field of Classification Search
CPC ..... G06F 1/3203; G06F 1/3234; G06F 1/3206
See application file for complete search history.

(56) References Cited

U.S. PATENT DOCUMENTS

| 6,539,008 | B1 | 3/2003 | Ahn |
| 6,564,328 | B1 | 5/2003 | Grochowski et al. |
| 6,651,176 | B1 | 11/2003 | Soltis, Jr. |
| 7,337,339 | B1 * | 2/2008 | Choquette ............. G06F 1/3287 |
| | | | 713/320 |
| 7,689,849 | B2 | 3/2010 | Sokorac |
| 8,510,582 | B2 | 8/2013 | Naffziger et al. |
| 8,788,779 | B1 | 7/2014 | Horn |
| 8,914,661 | B2 | 12/2014 | Henry et al. |
| 8,924,758 | B2 | 12/2014 | Steinman et al. |
| 9,069,555 | B2 | 6/2015 | Fetzer et al. |
| 9,430,242 | B2 | 8/2016 | Nelson et al. |
| 9,798,375 | B1 | 10/2017 | Becker |
| 9,846,463 | B2 | 12/2017 | Sistla et al. |
| 9,971,390 | B1 | 5/2018 | Becker |
| 2007/0165747 | A1 | 7/2007 | May |
| 2008/0263373 | A1 | 10/2008 | Meier |
| 2009/0089602 | A1 | 4/2009 | Bose |
| 2012/0105050 | A1 | 5/2012 | Naffziger |
| 2012/0144221 | A1 | 6/2012 | Naffziger et al. |
| 2013/0151869 | A1 | 6/2013 | Steinman |
| 2013/0339757 | A1 | 12/2013 | Reddy |
| 2014/0068293 | A1 * | 3/2014 | Man ...................... G06F 1/3206 |
| | | | 713/320 |
| 2014/0095905 | A1 * | 4/2014 | Sistla ...................... G06F 1/329 |
| | | | 713/320 |

(Continued)

*Primary Examiner* — Jaweed A Abbaszadeh
*Assistant Examiner* — Gayathri Sampath
(74) *Attorney, Agent, or Firm* — Kowert, Hood, Munyon, Rankin & Goetzel, P.C.; Lawrence J. Merkel

(57) ABSTRACT

In an embodiment, a local throttling mechanism for the one or more processor cores may support one or more externally-triggered throttling mechanisms. An external source, such as a system-level power manager, may detect an energy-consumption state in the system as a whole and may trigger additional throttling in the processor core throttling mechanism. The externally-triggered throttling may temporarily increase throttling in the processor cores, in an embodiment, decreasing processor core energy consumption to account for the excess energy consumption in other parts of the system.

21 Claims, 8 Drawing Sheets

(56) References Cited

U.S. PATENT DOCUMENTS

| | | |
|---|---|---|
| 2014/0143558 A1 | 5/2014 | Kuesel |
| 2014/0181503 A1 | 6/2014 | Bettink |
| 2014/0189413 A1* | 7/2014 | Hasenplaugh ........ G06F 1/3234 |
| | | 713/340 |
| 2014/0317425 A1 | 10/2014 | Lien et al. |
| 2014/0380072 A1 | 12/2014 | Lee |
| 2015/0089249 A1 | 3/2015 | Hannon et al. |
| 2015/0089254 A1 | 3/2015 | Burns et al. |
| 2015/0185813 A1 | 7/2015 | Ping et al. |
| 2016/0062447 A1* | 3/2016 | Hsu ....................... G06F 1/3243 |
| | | 713/300 |
| 2019/0041969 A1* | 2/2019 | Nge ....................... G06F 1/329 |
| 2019/0332157 A1* | 10/2019 | Hsu ........................ G06F 1/329 |

* cited by examiner

EXTERNALLY-TRIGGERED THROTTLING

BACKGROUND

Technical Field

Embodiments described herein are related to energy management in processors and, more particularly, to throttling processors to reduce a rate of energy consumption.

Description of the Related Art

Many devices include multiple processor cores. Processor cores can be significant energy consumers, especially under certain workloads. Accordingly, there can be operating points (combinations of supply voltage magnitude and operating frequency) at which, if all the processor cores are actively executing, the device is at risk of exceeding a capacity of a power supply in the device. That is, the power supply is only capable of sourcing a certain amount of energy per unit time (e.g., a clock cycle). If one or more processor cores are actively executing energy consumption-intensive workloads at some operating points, the resulting aggregate energy consumption rate can, in some cases, exceed the capacity of the power supply. Exceeding the capacity of the power supply may cause erroneous operation (e.g., the supply voltage magnitude may drop to a point at which the device no longer operates properly at the operating frequency).

One way to limit the energy consumption rate of the device is to reduce the rate at which the workloads are executed, a process called throttling. One form of throttling involves preventing a processor core from executing a portion of a workload during a current clock cycle, instead inserting a stall into a pipeline of the processor core. Typically, such throttling mechanisms are controlled local to the processor cores, using a credit-based mechanism in which energy consumption is accounted for and throttling is invoked if the credits expire or reach a predefined low point.

The local throttling mechanism is often sufficient to ensure that the processor cores do not overwhelm the power supply. However, in some cases, energy consumption in other parts of the system may increase and the local throttling mechanism can be insufficient to ensure that overall energy consumption rate in the system remains within limits of the power supply.

SUMMARY

In an embodiment, a local throttling mechanism for the one or more processor cores may support one or more externally-triggered throttling mechanisms. An external source, such as a system-level power manager, may detect an energy-consumption state in the system as a whole and may trigger additional throttling in the processor core throttling mechanism. The externally-triggered throttling may temporarily increase throttling in the processor cores, in an embodiment, decreasing processor core energy consumption to account for the excess energy consumption in other parts of the system.

BRIEF DESCRIPTION OF THE DRAWINGS

The following detailed description makes reference to the accompanying drawings, which are now briefly described.

Figure 1:
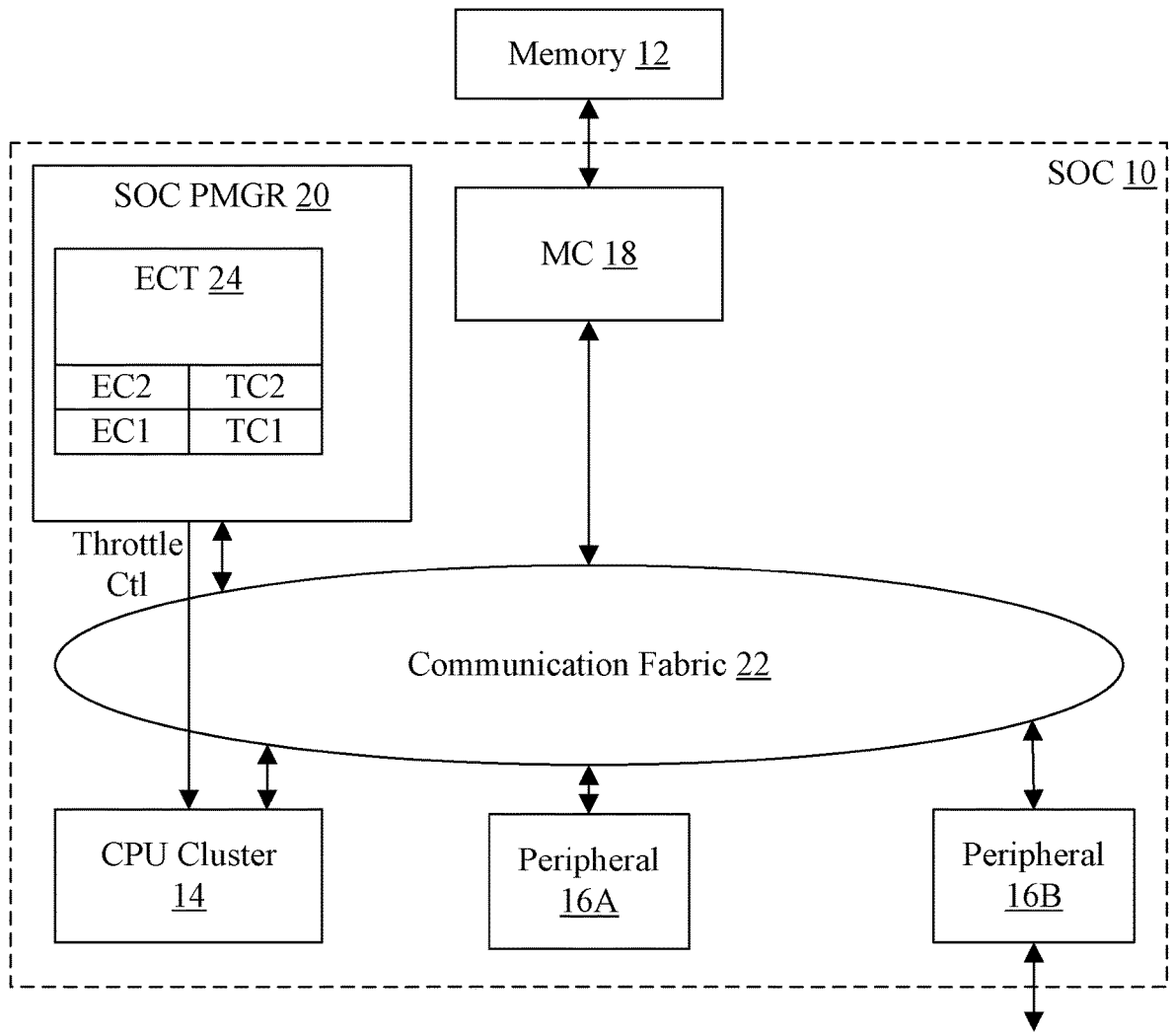
FIG. 1 is a block diagram of one embodiment of a system on a chip (SOC) including a processor cluster.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

FIG. 1 is a block diagram of one embodiment of a system on a chip (SOC) 10 coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a processor cluster 14. The processors may be central processing units (CPUs), in an embodiment, and thus the processor cluster 14 may be a CPU cluster 14. In the illustrated embodiment, components of the SOC 10 further include peripheral components 16A-16B (more briefly, "peripherals" 16), a memory controller 18, an SOC power manager (PMGR) 20, and a communication fabric 22. The components 14, 16, 18, and 20 may all be coupled to the communication fabric 22, and thus to each other for communication between the components. The memory controller 18 may be coupled to the memory 12 during use.

The SOC PMGR 20 may be configured to control the supply voltage magnitudes requested from the power management unit (PMU) in the system. There may be multiple supply voltages generated by the PMU for the SOC 10. For example, a voltage may be generated for the processor cores in the CPU cluster 14, and another voltage may be generated for other components in the SOC 10. In an embodiment, the other voltage may serve the memory controller 18, the peripherals 16, the SOC PMGR 20, and the other components of the SOC 10 and power gating may be employed based on power domains. There may be multiple supply voltages for the rest of the SOC 10, in some embodiments. In some embodiments, there may also be a memory supply voltage for various memory arrays in the CPU cluster 14 and/or the SOC 10. The memory supply voltage may be used with the voltage supplied to the logic circuitry, which may have a lower voltage magnitude than that required to ensure robust memory operation. The SOC PMGR 20 may be under direct software control (e.g. software may directly request the power up and/or power down of components) and/or may be configured to monitor the SOC 10 and determine when various components are to be powered up or powered down. For the CPU cluster 14, the voltage requests may be provided to the SOC PMGR 20, which may communicate the requests to the PMU to effect the change in supply voltage magnitudes.

Additionally, the SOC PMGR 20 may be configured to monitor the energy consumed by the components of the SOC 10. One or more of the components may support mechanisms to control the rate of energy consumption (e.g. throttling mechanisms in the CPU cluster 14, or other mechanisms). The components may independently operate the energy consumption control mechanisms, or the SOC PMGR 20 may control the mechanisms, or a combination thereof. Some components may not have energy consumption control mechanisms.

While the CPU cluster 14 supports an energy control/throttling mechanism (described in more detail below) that may generally be used to limit CPU energy consumption rates to levels that the PMU supplying the SOC 10 may support, it is possible in some cases that energy consumption in other components of the system, in conjunction with the controlled energy consumption of the CPU cluster 14, may temporarily approach or exceed the PMU capabilities. The SOC PMGR 20 may monitor the overall energy consumption, and detect states in which the energy consumption rate is reaching such levels. For example, in the embodiment of FIG. 1, the SOC PMGR 20 may include a programmable energy consumption table 24. The entries of the table 24 may correspond to various levels of energy consumption in the system (e.g. energy consumption level 1 (EC1), energy consumption level 2 (EC2), etc.). Each entry of the table 24 may also include a throttle control response (TC1, TC2, etc. in FIG. 1). If the SOC PMGR 20 detects one of the energy consumption levels in the ECT 24, the SOC PMGR 20 may transmit the corresponding throttle control response from the ECT 24 to the CPU cluster 14 (Throttle Ctl in FIG. 1). The throttle control response may cause additional throttling in the CPU cluster 14 to account for the overall power consumption in the system. That is, the CPU cluster 14 may support internal throttling mechanisms, but may also support additional throttling in response to one or more external throttle controls from the SOC PMGR 20.

The additional throttling in the CPU cluster 14 based on SOC PMGR 20 inputs may be viewed as "emergency throttling," to manage temporary energy consumption states in the system as a whole. The internal throttling supported by the CPU cluster 14 may generally be expected to be sufficient to ensure integrity in the power supply to the SOC 10 for CPU energy consumption. Thus, the SOC PMGR 20 may continue to assert the throttle control(s) to the CPU cluster 14 for the duration of time in which the additional throttling is needed or desired due to the detected energy states in the table 24, and then may deassert the throttle control(s) once the overall power consumption is reduced. The CPU cluster 14 may continue with its internal throttling when the throttle control(s) from the SOC PMGR 20 are deasserted.

In an embodiment, the SOC PMGR 20 may support at least two throttle controls. One throttle control may be used to modify the credit budgets used in the internal throttling mechanism of the CPU cluster 14. The modified credit budget may generally be reduced compared to the unmodified credit budget, causing more throttling of the CPU processor cores than would be the case for the unmodified credit budget. This throttle control may thus be an "absolute" energy consumption control. That is, the amount of energy that the processor cores are permitted to consume decreases to comply with the modified credit budget.

The second throttle control may be a "relative" throttle control. In response to the second throttle control, the CPU cluster 14 may throttle a specified percentage or fraction of clock cycles. The clock cycles that are not throttled based on the second throttle control may be controlled by the local throttling (e.g. credit budget based) and workload. Thus, the relative throttle control may limit the current rate of execution by the specified fraction.

The CPU cluster 14 is described in more detail below, but generally may include one or more processor cores that act as the CPUs of the SOC 10. The CPUs may generally execute the software that controls overall operation of the system (e.g. operating system software) and various application software that provides the functionality desired in the system. In some embodiments, there may be more than one CPU cluster 14. The CPU cluster 14 may include energy monitoring circuits that monitor the energy consumed by the processor cores, and may implement throttling based on the local monitoring.

The memory controller 18 may generally include the circuitry for receiving memory operations from the other components of the SOC 10 and for accessing the memory 12 to complete the memory operations. The memory controller 18 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 18 may include queues for memory operations, for ordering (and potentially reordering) the operations and presenting the operations to the memory 12. The memory controller 18 may further include data buffers to store write data awaiting write to memory and read data awaiting return to the source of the memory operation. In some embodiments, the memory controller 18 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the shared cache or caches in the processors, which serve only certain components. Additionally, in some embodiments, a system cache need not be located within the memory controller 18.

The peripherals 16A-16B may be any set of additional hardware functionality included in the SOC 10. For example, the peripherals 16A-16B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 16B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 22 may be any communication interconnect and protocol for communicating among the components of the SOC 10. The communication fabric 22 may be bus-based, including shared bus configurations, cross bar configurations, and hierarchical buses with bridges. The communication fabric 22 may also be packet-based, and may be hierarchical with bridges, cross bar, point-to-point, or other interconnects.

It is noted that the number of components of the SOC 10 may vary from embodiment to embodiment. There may be more or fewer of each component than the number shown in FIG. 1.

In one embodiment, the cluster energy management system for the CPU cluster 14 allocates processor cores of the CPU cluster 14 with respective quantities of credits, where the credits available to a processor core indicate an amount (e.g., a maximum amount) of energy the processor core is authorized to consume during a particular window of time (e.g., a clock cycle or a fixed number of clock cycles). In some cases, credits are allocated to the processor cores periodically. After the processor cores are allocated energy credits, the processor cores may consume the energy credits by performing pipeline operations (e.g., executing instructions). The processor cores may delay performance of one or more pipeline operations based on a number of respective remaining credits (e.g., due to an insufficient number of remaining credits). In some cases, performance of the one or more pipeline operations may be resumed at a later time, such as when additional credits are allocated. If a processor core does not use all allocated credits during a particular window of time, in some cases, the processor core may use the remaining allocated credits during a future window of time (e.g., credits may roll over between windows of time up to a maximum credit budget of the processor cores). Use of a credit distribution scheme may allow the system to quickly and flexibly control a rate of energy consumption by the processor cores without exceeding a maximum energy supply rate of the system (e.g., based on the power supply).

As noted above, energy allocations are distributed to multiple cores (e.g., using a credit distribution circuit) from a shared supply of energy (e.g., energy credits received by the credit distribution circuit in each clock cycle). In some cases, the amount of energy allocated to one or more cores may be exhausted, causing the one or more cores to delay performance of one or more respective pipeline operations until additional energy is allocated to the one or more cores. Accordingly, in some cases, the one or more cores may all determine to delay performance of one or more respective pipeline operations, for example, during a same clock cycle, and to perform (e.g., to resume performing) the one or more pipeline operations during a same clock cycle (e.g., after the additional energy credits are distributed). The multiple cores delaying the performance of the one or more respective pipeline operations during a same clock cycle and performing the one or more respective pipeline operations during another same clock cycle may add additional noise to a power supply network of the system. In one embodiment, at least two of the processor cores and/or execution pipelines apply a respective pseudo-random component to a respective current amount of remaining allocated energy of the processor core (e.g., a number of credits allocated to the processor core), a respective stall threshold, or both. Use of the respective pseudo-random components may cause the processor cores to delay performing respective pipeline operations (e.g., to avoid exhausting respective allocated energy credits) in a staggered manner. As a result, a noise level of a power supply network of the system may be reduced, as compared to a system where pseudo-random components are not used.

As used herein, "pseudo-random components" refer to numbers within a particular range of values generated by a processing device. The pseudo-random components may be generated in a repeatable sequence (e.g., using a linear feedback shift register (LFSR)) or may be truly random (e.g., generated based on a least significant digit voltage measurement of the system).

Although this disclosure is written in terms of energy consumption and energy consumption rate limiting, it is noted that similar systems could be created that operate based on other related units of measure (e.g., current and rate of charge depletion). Accordingly, when "energy" is used herein, other related units of measure are similarly considered.

Figure 2:
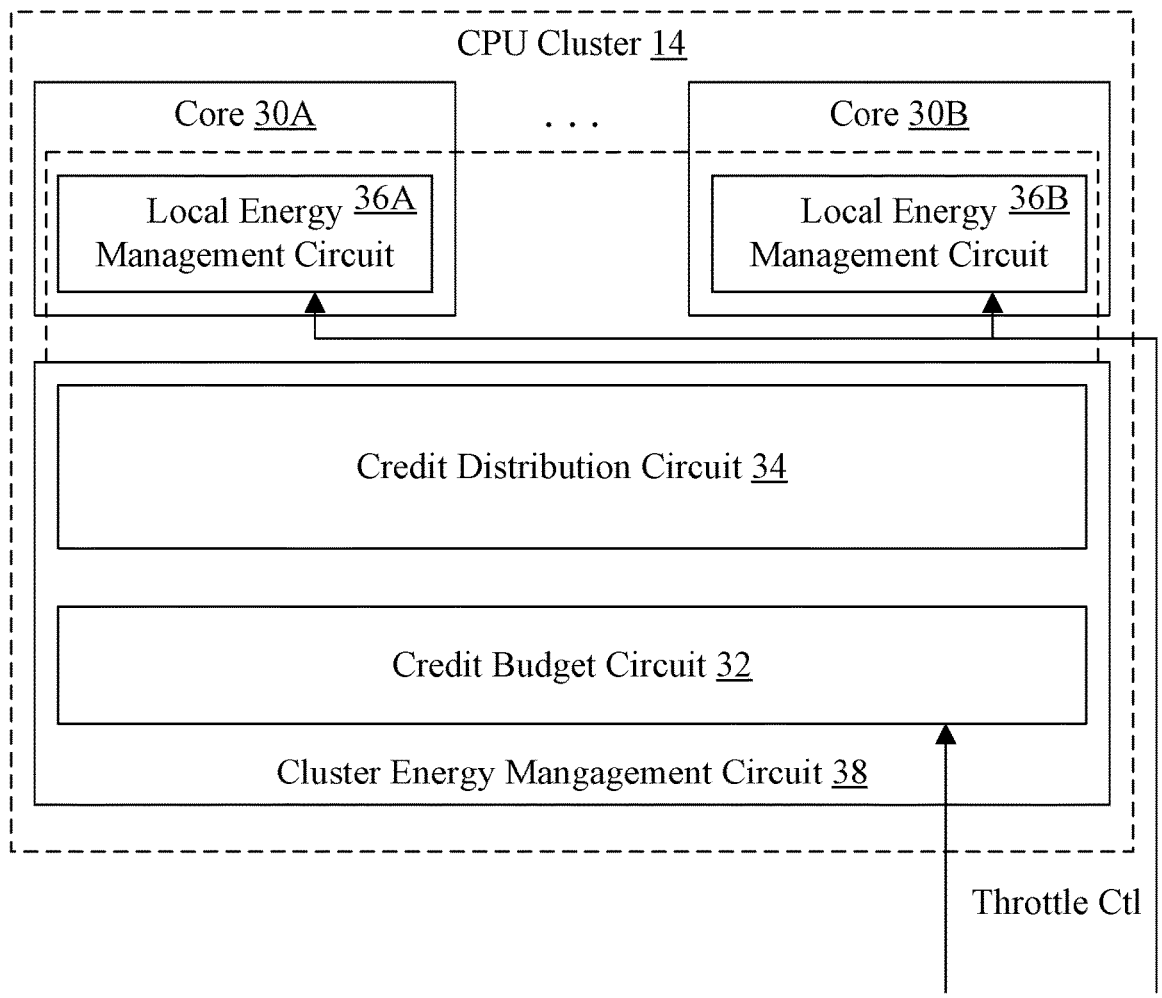
FIG. 2 is a block diagram of one embodiment of the processor cluster in greater detail.

Turning now to FIG. 2, a block diagram of one embodiment of the CPU cluster 14 configured to limit a rate of energy consumption is shown. In the illustrated embodiment, the CPU cluster 14 includes a cluster energy management circuit 38 and one or more processor cores such as cores 30A-30B. The cluster energy management circuit 38 includes a credit budget circuit 32 and a credit distribution circuit 34. In the illustrated embodiment, the cores 30A-30B include local energy management circuits 36A-36B. The local energy management circuits 36A-36B may be part of the cluster energy management circuit 38 as well, as illustrated by the dotted line enclosing the local energy management circuits 36A-36B and extending to the cluster energy management circuit 38. The credit budget circuit 32 is coupled to one of the throttle controls from the SOC PMGR 20, and the local energy management circuits 36A-36B are coupled to the other throttle control. More particularly, in one embodiment, the credit budget circuit 32 may receive the throttle control that modifies the credit budgets, and the local energy management circuits 36A-36B may receive the throttle control that throttles by a specified fraction.

As previously discussed, within a specific window of time, a certain maximum amount of energy may be available for use at various portions of CPU cluster 14. The various portions of CPU cluster 14 may use corresponding portions of the energy as needed during the window of time. The available energy may represented by credits, where each credit equates to a certain amount of energy. The credits may be distributed evenly between cores 30A-30B (and other circuitry in the CPU cluster 14, if any, such as a shared cache for the cores 30A-30B), or unevenly between cores 30A-30B. Different cores may consume some or all of the allocated energy differently, at different rates and different times. Some cores may not consume all of the allocated energy during the particular time window. Accordingly, at least some energy may remain at the end of the particular time window and will be available for use in subsequent windows (e.g., in addition to additional energy produced by the power supply unit).

The credit budget circuit 32 may generate a credit budget for the CPU cluster 14, e.g. based on the particular maximum rate from the power supply unit. For example, as discussed in further detail below, the credit budget circuit 32 may include a lookup table that indicates the energy budget based on a current voltage/frequency state of the CPU cluster 14, a desired voltage/frequency state of the CPU cluster 14, or both. The credit budget circuit 32 may indicate the energy budget to the credit distribution circuit 34. In some embodiments, a leakage estimator may estimate an amount of leakage associated with the current or desired voltage/frequency state of the central processing unit, and the credit budget circuit 32 may reduce the energy budget using the estimated amount of leakage. In a particular embodiment, the credit budget circuit 32 may indicate the energy budget to the credit distribution circuit 34 by indicating a total credit budget (e.g., a maximum number of credits) to be allocated during a corresponding time window.

As discussed further below, the credit distribution circuit 34 may receive requests for additional energy for the cores 30A-30B (e.g., from the cores 30A-30B themselves or from one or more other circuits) and may provide, to the cores 30A-30B, respective additional credits. The credits may be sent in accordance with an allocation scheme implemented by the credit distribution circuit 34 (e.g., a round robin allocation scheme, a priority-based allocation scheme, or another allocation scheme). Accordingly, the credit distribution circuit 34 may control energy consumption of the cores 30A-30B by limiting the credits provided to the cores 30A-30B. As a result, in some cases, some cores may be authorized to consume more energy than other cores at certain points in time. Thus, the credit distribution circuit 34 may provide flexibility regarding energy consumption of the cores 30A-30B.

The cores 30A-30B may receive instructions to be executed. Each instruction is executed as one or more respective pipeline operations in the pipelines of the cores 30A-30B. The cores 30A-30B may also track a respective amount of energy (e.g., a respective number of credits) allocated to the cores 30A-30B (e.g. via the local energy management circuits 36A-36B) and may limit pipeline operations when credits are not available to consume (e.g. the pipelines may be throttled). In some embodiments, the cores 30A-30B may be configured to share credits with other cores. For example, in response to the core 30A having fewer credits than a request threshold, the core 30A may indicate to one or more other cores of cores such as the core 30B that the core 30A has fewer credits than the request threshold. In response, the core 30B may determine that the core 30B has more credits than a sharing threshold and may provide one or more credits to the core 30A.

In response to a change in the energy budget, the credit distribution circuit 34 may adjust energy consumption of the cores 30A-30B within particular windows of time. For example, the credit distribution circuit 34 may provide additional credits for a particular window of time to the cores 30A-30B in response to one or more requests for additional credits. As another example, the credit distribution circuit 34 may not provide additional credits or may provide fewer than a requested number of credits to the cores 30A-30B for the particular window of time in response to the requests for additional credits. As a result, the cores 30A-30B may delay one or more pipeline operations (e.g. throttle the pipeline(s)), reducing the rate of energy consumption of the CPU cluster 14.

Figure 3:
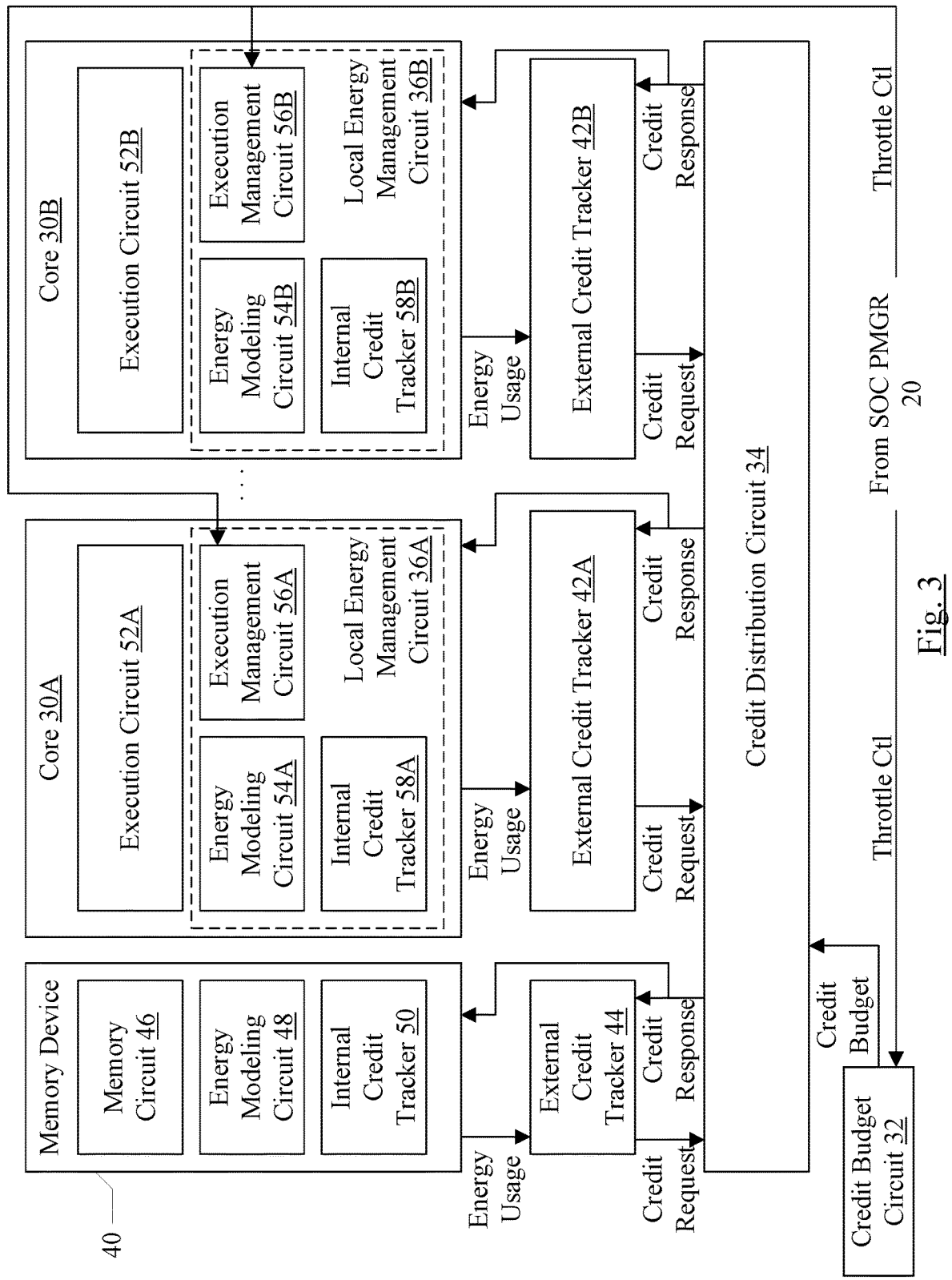
FIG. 3 is a block diagram of one embodiment of the processor cluster in still greater detail.

Turning now to FIG. 3, a block diagram illustrating portions of one embodiment of the CPU cluster 14 is shown in greater detail. In the illustrated embodiment, the CPU cluster 14 additionally includes a memory device 40 and external credit trackers 42A-42B and 44. The memory device 40 includes a memory circuit 46, and energy modeling circuit 48, and an internal credit tracker 50. The cores 30A-30B include respective execution circuits 52A-52B and the respective local energy management circuits 36A-36B. The energy management circuits 36A-36B each include an energy modeling circuit 54A-54B, an execution management circuit 56A-56B, and an internal credit tracker 58A-58B. As discussed further below, in other embodiments, the CPU cluster 14 may not include at least one of the memory device 40, the external credit tracker 44, or the external credit trackers 42A-42B. The credit budget circuit 32 is coupled to the credit distribution circuit 34 and a throttle control from the SOC PMGR 20. The credit distribution circuit 34 is coupled to the external credit trackers 42A-42B and 44, and to the memory device 40 and cores 30A-30B. The external credit tracker 44 is coupled to the memory device 40, and the external credit trackers 42A-42B are coupled to the cores 30A-30B respectively. The execution management circuits 56A-56B are coupled to a throttle control from the SOC PMGR 20.

As described above, the credit budget circuit 32 may generate an energy budget (e.g., the credit budget provided to the credit distribution circuit 34) for the cores 30A-30B and may communicate the credit budget to the credit distribution circuit 34. In the illustrated embodiment, the credit budget further corresponds to the memory device 40. In some embodiments, other devices also correspond to the credit budget.

The memory device 40 may perform memory operations in the memory circuit 46 in response to one or more memory requests. The energy modeling circuit 48 may determine a number of credits consumed by the memory operations. In some embodiments, the determined number of credits may be an estimate (e.g., based on a type of memory request). The determined number of credits may be provided to the internal credit tracker 50 and the external credit tracker 44 (shown as energy usage in FIG. 3). The memory device 40 may be unable to delay the one or more memory operations. Accordingly, the internal credit tracker 50 may track a number of credits allocated to the memory device 40 and may signal an error in response to the memory device 40 having fewer credits than an error threshold amount. In other embodiments, the memory device 40 may not include the internal credit tracker 50. Additionally, in other embodiments, the memory device 40 may be able to delay the one or more memory operations.

The external credit tracker 44 may receive, from the memory device 40, the energy usage and may, in response to the memory device 40 having fewer credits than a request threshold amount, send a credit request to the credit distribution circuit 34. The external credit tracker 44 may be able to communicate with the credit distribution circuit 34 more quickly, as compared to the internal credit tracker 50. Thus, the external credit tracker 44 may provide lower latency credit requests without requiring fast communication channels between the memory device 40 and the credit distribution circuit 34. As noted above, in some embodiments, the memory device 40 is unable to delay one or more memory operations. Accordingly, the credit distribution circuit 34 may prioritize the credit request from the memory device 40, as compared to credit requests from the cores 30A-30B. In response to the credit request, the credit distribution circuit 34 may send to the external credit tracker 44 and to the memory device 40 a credit response. The credit response may include one or more credits allocated by the credit distribution circuit 34 to the memory device 40. In some embodiments, rather than the memory device 40 being a memory device, memory device 40 may correspond to another circuit that is unable to delay one or more operations.

As described further below with reference to FIG. 4, the cores 30A-30B may selectively determine whether to perform one or more pipeline operations in the execution circuits 52A-52B based on whether a sufficient number of respective credits are available. Accordingly, the internal credit trackers 58A-58B may indicate, to the execution management circuits 56A-56B, a respective number of credits allocated to the respective cores 30A-30B. In response to the indication from the respective internal credit trackers 58A-58B, the execution management circuits 56A-56B may be configured to cause the execution circuits 52A-52B to selectively delay performance of the one or more pipeline operations. This process will be described in more detail below with reference to FIG. 4.

Similar to the process described above regarding the memory device 40, the external credit trackers 42A-42B may receive indications of energy usage of respective cores 30A-30B and may track credits allocated to the respective cores 30A-30B in a manner similar to the respective internal credit trackers 58A-58B, as described further below. In response to a number of credits for a respective core being lower than a request threshold amount, the external credit trackers 42A-42B may send respective credit requests to the credit distribution circuit 34. As described above, the credit distribution circuit 34 may allocate credits according to an allocation scheme. For example, in response to determining to allocate one or more credits to the core 30A, the credit distribution circuit 34 may send a credit response to the external credit tracker 42A and to the core 30A.

Figure 4:
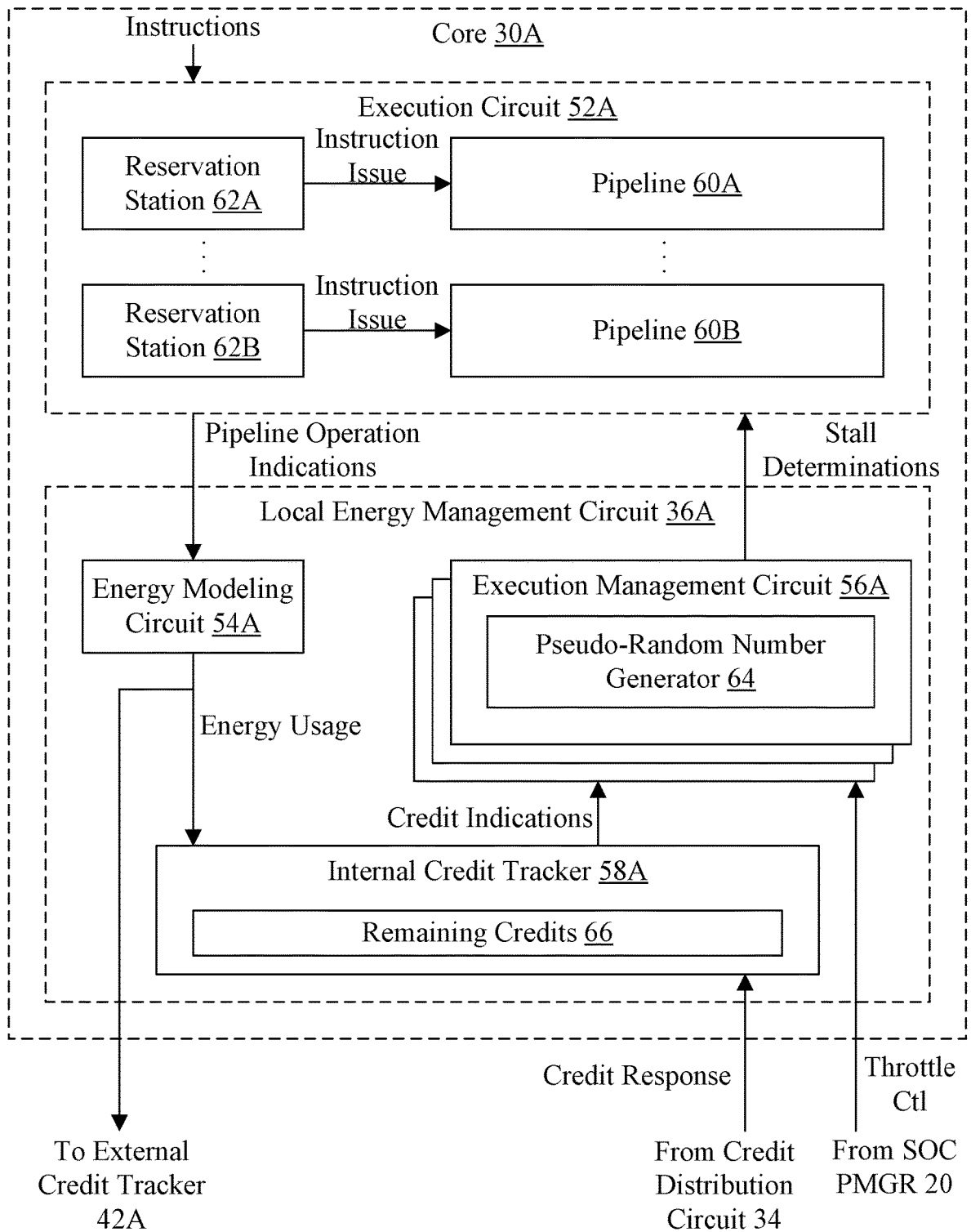
FIG. 4 is a block diagram of one embodiment of a processor core in greater detail.

Turning now to FIG. 4, a block diagram illustrating one embodiment of the core 30A is shown in greater detail. Core 30B (and other cores that may be included in various embodiments) may be similar. In the illustrated embodiment, the core 30A includes multiple execution management circuits 56A. For example, there may be an execution management circuit 56A for each of one or more pipelines 60A-60B in the execution circuit 52A. In other embodiments, the core 30A may include a single execution management circuit 56A to control the pipelines 60A-60B. The execution circuit 52A additionally includes one or more reservation stations 62A-62B coupled to the corresponding pipelines 60A-60B. The execution management circuit(s) 56A additionally include pseudo-random number generator (s) 64. The internal credit tracker 58A includes remaining credits 66. In some embodiments, the core 30A does not include the internal credit tracker 58A. As illustrated in FIG. 4, the energy modeling circuit 54A is coupled to the execution circuit 52A, the internal credit tracker 58A, and the external credit tracker 42A. The internal credit tracker 58A is coupled to the execution management circuit(s) 56A and the credit distribution circuit 34. The execution management circuit(s) 56A are coupled to the execution circuit 52A and the throttle control from the SOC PMGR 20.

The execution circuit 52A may selectively delay (stall) one or more pipelines 60A-60B. More particularly, the execution circuit 52A may receive instructions to be executed in the core 30A, and the instructions may be stored in the reservation stations 62A-62B. The instructions may wait in the reservation stations 62A-62B until they are ready to execute (e.g. operands have been provided via execution of earlier instructions, ordering constraints, if any, are met, etc.). The ready instructions are eligible to be issued to the respective pipelines 60A-60B for execution ("instruction issue" in FIG. 4). The instructions cause various operations in the pipelines 60A-60B, which consume energy. The execution circuit 52A may additionally receive stall determinations for each pipeline 60A-60B from the execution management circuit(s) 56A. If a stall determination corresponding to a given pipeline 60A-60B is not asserted (indicating the given pipeline 60A-60N is permitted to evaluate), the execution circuit 52A may be configured to issue an instruction (or data describing the operation to be performed) from a respective reservation stations 62A-62B to the given pipeline 60A-60B. However, if the stall determination corresponding to the given pipeline 60A-60B is asserted (indicating that the given pipeline 60A-60B is to be stalled, or delayed), the execution circuit 52A may prevent issuance of an instruction to the given pipeline 60A-60N even if an instruction the corresponding reservation station 62A-62B is eligible to be issued.

The energy modeling circuit 54A may receive one or more pipeline operation indications from the execution circuit 52A. The pipeline operation indications may indicate energy usage in the execution circuit 52A, and more specifically in the pipelines 60A-60B. In some embodiments, the pipeline operation indications may correspond to instruction issuances to each pipeline 60A-60B. The energy modeling circuit 54A may determine a number of credits associated with performing the pipeline operations indicated by pipeline operation indications and may indicate the number of credits to the internal credit tracker 58A and to the external credit tracker 42A, illustrated as "energy usage" in FIG. 4.

The energy usage may be an aggregate energy usage from pipelines 60A-60B or may represent multiple indications of energy usage from at least some of the pipelines 60A-60B.

The internal credit tracker 58A may track (e.g., maintain a running tally of) the remaining credits 66 allocated to the core 30A. Accordingly, in response to receiving energy usage from the energy modeling circuit 54A, the internal credit tracker 58A may reduce the remaining credits 66. In response to receiving a credit response from the credit distribution circuit 34, the internal credit tracker 58A may increase the remaining credits 66. The internal credit tracker 58A may periodically indicate remaining credits to the execution management circuit(s) 56A (the "credit indications" in FIG. 4). In some embodiments (e.g., embodiments where no external credit tracker 42A is present), in response to the remaining credits 66 falling below a request threshold, the internal credit tracker 58A may request additional credits from the credit distribution circuit 34.

The execution management circuit(s) 56A may determine, based on the credit indications, whether to delay execution in one or more of the pipelines 60A-60B (e.g., delaying issuing of instructions). In some embodiments, the execution management circuit(s) 56A may compare a number of credits assigned to the core 30A with a threshold to determine whether to delay execution (stall). The execution management circuit(s) 56A may further determine whether to stall based on an estimated number of credits to be consumed by respective instructions. The execution management circuit(s) 56A may indicate stalls to the execution circuitry 52A via the stall determination(s).

In some embodiments, determining whether to stall one or more pipelines 60A-60B may be performed independently for each pipeline 60A-60B. In some embodiments, the execution management circuit(s) 56A may prioritize some pipelines 60A-60B over other pipelines 60A-60B. Accordingly, the execution management circuit 56A may selectively request a stall of one or more pipelines 60A-60B based on the credit indications provided by the internal credit tracker 58A. In some embodiments, two or more of the pipelines 60A-60B may be grouped and stalled or not stalled as a group based on the execution management circuit(s) 56A Additionally, the execution management circuit(s) 56A may generate a pseudo-random component using pseudo-random number generator 64 and may apply the pseudo-random component to the number of credits, the thresholds, or both. The pseudo-random component may be applied to the number of credits, the thresholds, or both in many different ways (e.g., addition, subtraction, multiplication, division, shifting, logical transformations, etc.). For example, the pseudo-random component may be added to the thresholds and a resulting value may be compared to the remaining credits 66 (or credit indications) such that a particular pipeline or pipeline group may be stalled with some probability (e.g., a determination to stall may be pseudo-probabilistic) while the remaining credits 66 are in a potential stall region (e.g., depending on the value of the pseudo-random component). When pseudo-random components are used to make stalling decisions for multiple pipelines (e.g., pipelines of multiple cores) simultaneously, the pipelines are less likely to simultaneously stall or to simultaneously resume execution after a stall, thus reducing an amount of power supply noise associated with decisions to delay/issue pipeline operations.

In some embodiments, when multiple execution management circuits 56A are present, a single pseudo-random component may be generated. Alternatively, multiple pseudo-random components may be generated (e.g., potentially staggering stalling of various pipelines 60A-60B). In other embodiments, the pseudo-random component(s) may be received (e.g., from another circuit outside the core 30A). The pseudo-random component may be independent of a pseudo-random component used by another core (e.g., the core 30B). In some embodiments, the pseudo-random components may be generated using a linear distribution number generation algorithm (e.g., an algorithm that generates pseudo-random numbers with an exactly linear distribution), such as by using a linear feedback shift register. Generating the pseudo-random components using the linear distribution number generation algorithm may result in a more predictable stalling behavior of the system, thus potentially enabling control of a system-wide energy consumption rate closer to a requested energy consumption limit for a particular window of time without exceeding the requested energy consumption limit. However, in other embodiments, nonlinear behavior may be desired. Nonlinear behavior may be achieved in multiple ways, such as by using a nonlinear distribution number generation algorithm or by multiplying the pseudo-random component by the threshold, the remaining credits 66, or both. Other mathematical methods of applying the pseudo-random component to the comparison may also be used.

In an embodiment, the execution management circuits 56A may receive the throttle control from the SOC PMGR 20, and may throttle the pipelines 60A-60B for a specified fraction of clock cycles, as previously described. In an embodiment, the pseudo-random component from the pseudo-random number generator 64 may be compared to the specified fraction to determine if a stall should occur, thus randomizing the clock cycles for which a stall occurs over a window of clock cycles. Additional details are provided further below.

Externally-Triggered Throttling

Figure 5:
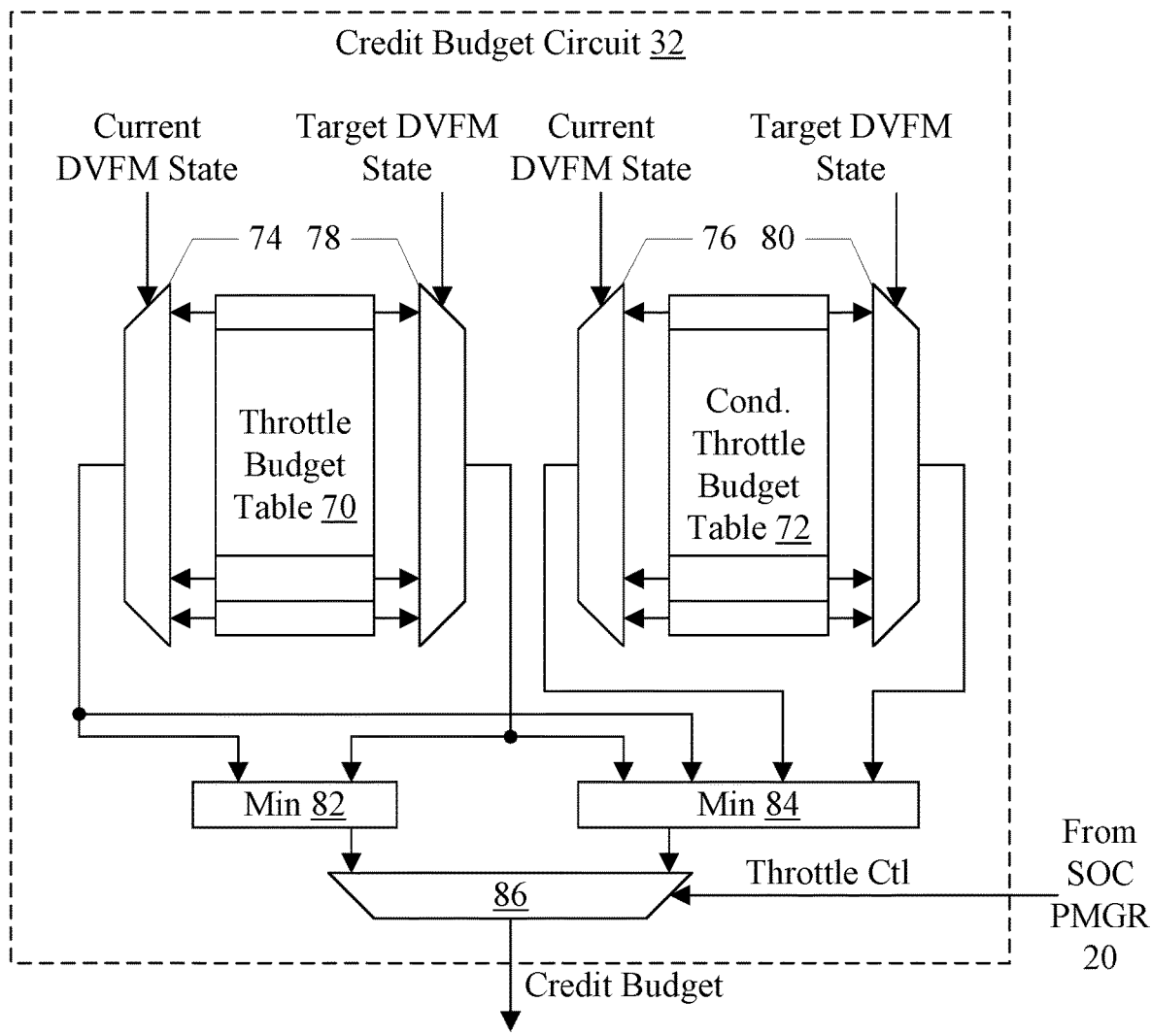
FIG. 5 is a block diagram of one embodiment of a credit budget circuit for the processor throttling mechanism including support for an external throttle trigger.
Figure 6:
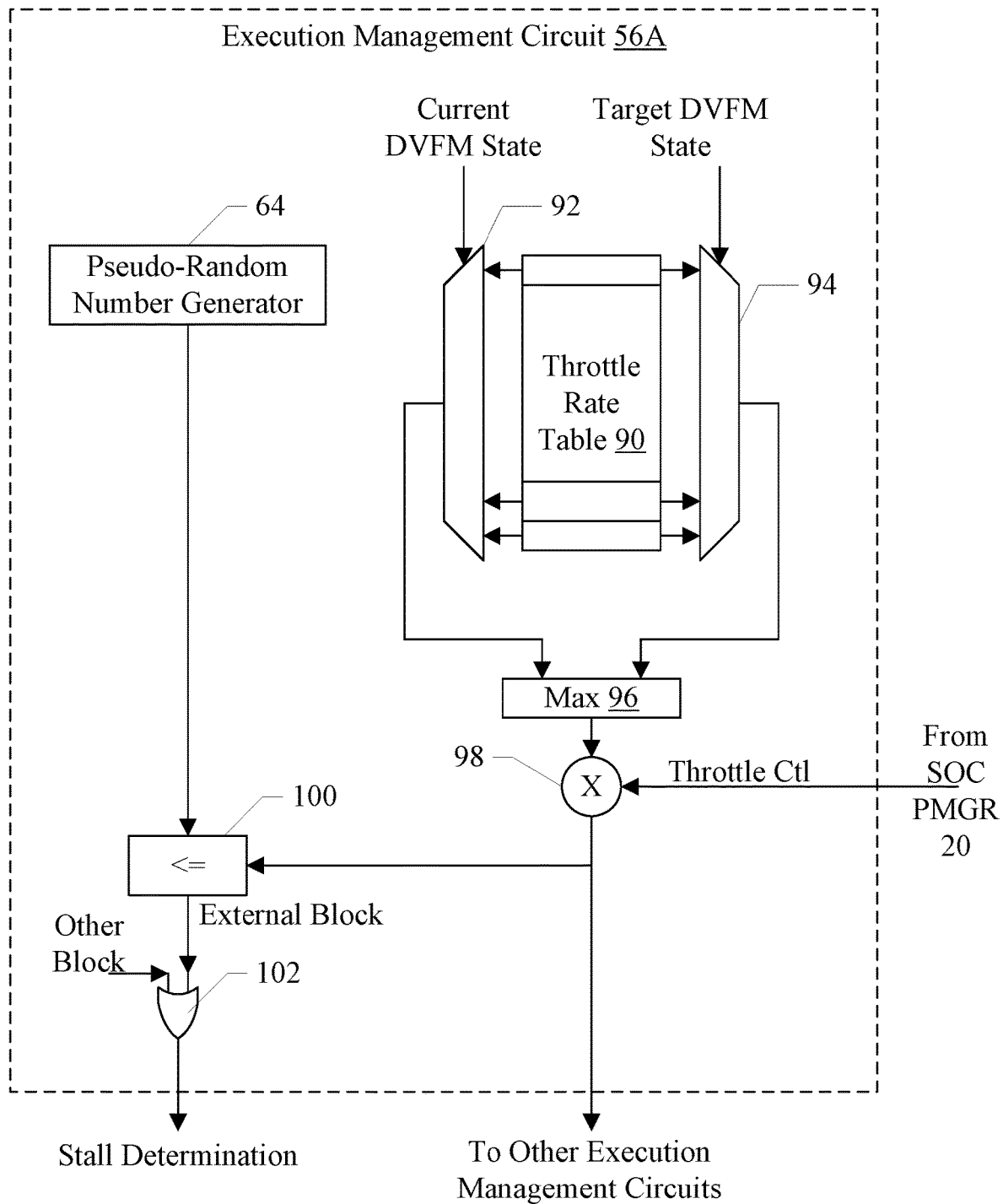
FIG. 6 is a block diagram of one embodiment of a throttle rate mechanism for the processor cluster that supports an external throttle trigger.
Figure 7:
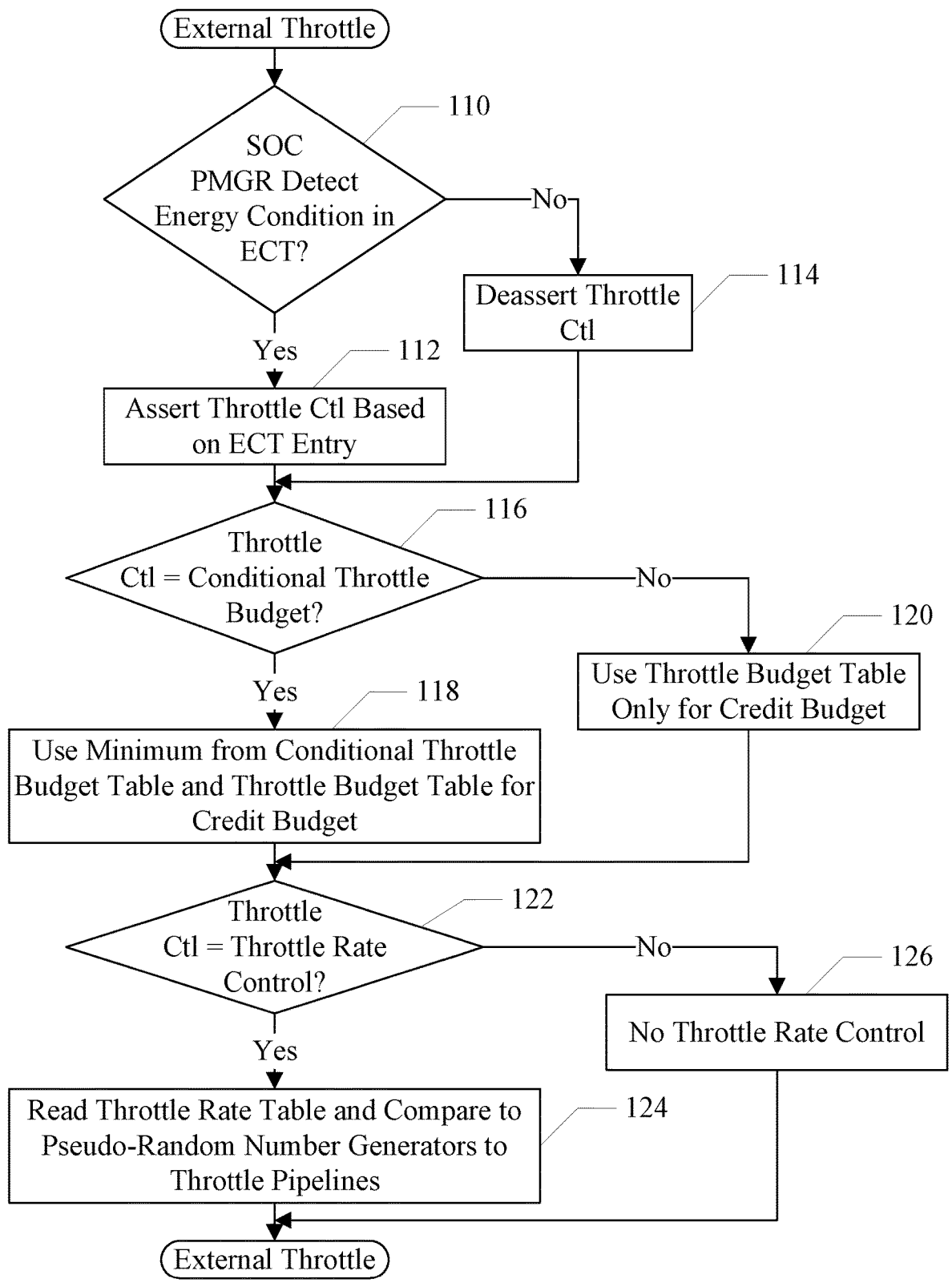
FIG. 7 is a flowchart illustrating operation of one embodiment of the external throttle mechanism.

FIGS. 5-7 illustrate examples of throttling mechanisms that may be implemented in various embodiments of the SOC 10/CPU cluster 14 to implement externally-triggered throttling in addition to the intracluster throttling implemented by the CPU cluster 14. Various embodiments may implement one or both externally-triggered throttling mechanisms, as desired.

FIG. 5 is a block diagram of one embodiment of the credit budget circuit 32. In the illustrated embodiment, the credit budget circuit 32 includes a throttle budget table 70 and a conditional throttle budget table 72. Each table 70 and 72 may include multiple entries that are programmable with credit budgets (e.g. one credit budget per entry). The tables 70 and 72 may be software programmable (e.g. by the operating system for the system that includes the SOC 10). For example, during boot of the system, the tables 70 and 72 may be programmed. The tables 70 and 72 may be reprogrammed at other times as well, in some embodiments.

Each entry of the tables 70 and 72 may correspond to a respective dynamic voltage and frequency management (DVFM) state of the processor cores 30A-30B. The DVFM state may be a value that represents a supply voltage magnitude and clock frequency setting for the cores 30A-30B. That is, the supply voltage magnitude may be the magnitude of the supply voltage to the cores 30A-30B. The clock frequency may be the frequency of the clock supplied to the cores 30A-30B. The supply voltage magnitude and clock frequency setting may be referred to more briefly, the voltage/frequency setting. The DFVM state may be a voltage/frequency state of the cores 30A-30B.

Generally, higher supply voltage magnitudes and higher clock frequencies correspond to higher possible performance in the cores, but also correspond to higher potential energy consumption. A given pipeline evaluating at a higher voltage generally consumes more energy than if it evaluates using a lower voltage. Pipelines evaluating at a higher clock frequency generally consume more energy per unit time if the pipelines are continuously busy, since they are evaluating faster. Accordingly, the credit budget for each DFVM state may be different, and thus the tables 70 and 72 are provided to permit a credit budget to be selected based on the DVFM state.

Based on performance demands in the system, energy conservation demands in the system, and potentially other factors, the DVFM state of the CPU cluster 14 may be modified over time. Thus, there may be a current DVFM state that represents the current voltage/frequency state of the CPU cluster 14, and a target DVFM state that represented a voltage/frequency state to which the CPU cluster 14 is transitioning. If there is no transition in progress, the target DVFM state may be equal to the current DVFM state. In order to support throttling during transition and to ensure that the throttling is appropriate for both the current DVFM state and the target DVFM state, two credit budgets may be read from each table 70 and 72, one indexed by the current DVFM state and the other indexed by the target DVFM state. The minimum credit budget may be selected (min circuits 82 and 84 in FIG. 5) to ensure that the selected credit budget is appropriate. Other embodiments may handle DVFM state transitions in other ways (e.g. selecting the higher energy consuming DVFM state and indexing the tables based on the state).

The throttle budget table 70 may be programmed with the credit budgets used by the intracluster throttling when no externally-triggered throttling is being signaled by the SOC PMGR 20. That is, the throttle budget table 70 may store the credit budgets that are based on the ability of the power supply to the CPU cluster 14 to supply energy to the cluster. The conditional throttle budget table 72 may store a second set of credit budgets that may be invoked via the throttle control from the SOC PMGR 20. The second set of credit budgets may be the modified credit budgets, in this embodiment. The credit budget for a given DVFM state in the conditional throttle budget table 72 may be expected to be a lower budget than the credit budget for the given DVFM state in the throttle budget table 70. Accordingly, an embodiment is contemplated in which the credit budget from the conditional throttle budget table 72 overrides the credit budget read from the throttle budget table 70 when the SOC PMGR 20 asserts the throttle control.

On the other hand, a more flexible approach may be used, which is illustrated in the embodiment of FIG. 5. The credit budgets supplied by both tables 70 and 72 may be provided to the min circuit 84, and which may select the minimum one of the credit budgets. Thus, for example, if the credit budget read from the conditional throttle budget table 72 were for some reason higher than the credit budget read from the throttle budget table 70, the credit budget from the throttle budget table 70 would be selected and thus the credit budget would not be increased based on the externally-triggered throttling by the SOC PMGR 20.

The tables 70 and 72 are referred to as being "indexed by" the DFVM state. Each table entry corresponds to a different DVFM state, and that table entry is selected from the tables 70 and 72 based on the DVFM state. In the illustrated embodiment, multiplexors (muxes) 74 and 76 are coupled to the tables 70 and 72, respectively, and select an entry of the tables based on the current DVFM state. Such a configuration may be used, e.g., if the tables 70 and 72 are implemented as a set of registers, flops, or other clocked storage devices. If the tables 70 and 72 are implemented as a random access memory (RAM), the memory may have a read port and the DFVM state may index the table via the address presented on the read port. Any implementation may be used. Similarly, the muxes 78 and 80 are coupled to the tables 70 and 72, respectively, and index the tables 70 and 72 based on the target DVFM state. The outputs of table 70 for each DVFM state are provided to the min circuit 82, which may select the minimum credit budget. The outputs of the tables 70 and 72 for each DVFM state are provide to the min circuit 84, which may select the minimum credit budget as well. The selected minimum credit budgets are provided to the mux 86, which is controlled by the throttle control from the SOC PMGR 20. If the throttle control is not asserted (no externally-triggered throttling signaled by the SOC PMGR 20), the mux 86 may output the credit budget from the min circuit 82. That is, the credit budget from the throttle budget table 70 may be output. If the throttle control is asserted, the mux 86 may output the credit budget from the min circuit 84. Accordingly, the credit budget may be a modified credit budget responsive to the assertion of the throttle control signal from the SOC PMGR 20.

The selected credit budget is provided to the credit distribution circuit 34. When the modified credit budget is selected (presumably reduced compared to the unmodified credit budget from the throttle budget table 70), the modified credit budget may affect the credits supplied to the cores 30A-30B in response to subsequent credit requests, resulting in more throttling (assuming the modified credit budget is lower than the unmodified credit budget) until the throttle control is deasserted and the unmodified credit budget is again supplied as the output of the mux 86. The unmodified credit budget may affect the credits supplied to the cores 30A-30B in response to subsequent credit requests, resulting in less throttling (assuming the unmodified credit budget is higher than the modified credit budget).

Other embodiments may generate modified credit budgets in other ways. For example, the conditional throttle budget table 72 may store modifications (e.g. deltas) to be applied to the budgets read from the throttle budget table 70. When the throttle control is asserted, the modification from the conditional throttle budget table 72 may be subtracted from the credit budget supplied by the throttle budget table 70 to produce the modified credit budget.

FIG. 6 is a block diagram of one embodiment of the execution management circuit 56A. In the illustrated embodiment, the execution management circuit 56A includes the pseudo-random number generator circuit 64 as previously discussed. The execution management circuit 56A may also include a throttle rate table 90. The throttle rate table 90 may include an entry for each DVFM state, programmable with a throttle rate corresponding to that DVFM state. The throttle rate may specify a fraction of clock cycles in which the corresponding pipeline or pipelines 60A-60B is to be throttled. Similar to the budget tables 70 and 72, the throttle rate table 90 may be coupled to muxes 92 and 94 to permit indexing of the table 90 by the current DVFM state and the target DVFM state, respectively. A maximum circuit (max circuit 96) is coupled to the outputs of the muxes 92 and 94 may select the maximum of the throttle rates. In this case, the maximum is selected because the throttle rate is a fraction of time that throttling is to be applied, and thus a higher fraction leads to more throttling.

A multiplier 98 is shown in FIG. 6, coupled to the output of the max circuit 96 and multiplying the throttle control from the SOC PMGR 20 by the selected throttle rate. The multiplier 98 may reflect the gating of the throttle rate by the throttle control. That is, if the throttle control signal is deasserted (no external throttling requested), the multiplication may lead to a zero throttle rate and thus no throttling may be performed based on the throttle rate control (although throttling based on the local intracluster throttling mechanisms may be employed, e.g. based on the throttle budget table 70). If the throttle control is asserted (external throttling is requested), the multiplication result may be the throttle rate and thus externally-triggered throttling may occur. Other implementations may use any circuit (e.g. a mux selecting between zero and the throttle rate output by the max circuit 96 based on the throttle control, a bitwise AND of the throttle rate output by the max circuit 96 and the throttle control, etc.).

The gated throttle rate may be compared to the pseudo-random number from the pseudo-random number generator circuit 64 (comparator circuit 100). If the pseudo-random number is less than or equal to the throttle rate, the comparator 100 may assert the external block output. The external block output may be logically combined with other block determinations (e.g. based on credits available and the like, OR gate 102) to generate the stall determination for the pipeline or pipelines 60A-60B that are controlled by the execution management circuit 56A. In an embodiment, the pseudo-random number may be a positive integer within a predetermined range. That is, the pseudo-random number may not be zero or less than zero. Accordingly, if the gated throttle rate is zero (no throttling), the comparison with a positive integer may result in a deasserted external block output from the comparator 100. If the gated throttle rate is non-zero, the magnitude of the gated throttle rate compared to the range of the pseudo-random number generator 64 specifies the fraction of clock cycles in which throttling may be signaled. For example, if the pseudo-random number is a 16 bit value (e.g. 1 to 65,535 in decimal), a gated throttle rate of 32,768 (decimal) would result in approximately 50% throttling. A gated throttle rate of 16,384 (decimal) would result in approximately 25% throttling, etc.

In embodiments in which there are multiple execution management circuits 56A for a given core 30A-30B (e.g., controlling different subsets of the pipelines 60A-60B), the throttle rate table 90 and related circuitry to generate the gated throttle rate may be shared by the execution management circuits 56A. Thus, the gated throttle rate may be output to the other execution management circuits as shown in FIG. 6. Still further, the throttle rate table 90 and related circuitry may be shared by the cores 30A-30B in the cluster. The throttle rate table 90 and related circuitry may be implemented at any convenient location in the CPU cluster 14 and the gated throttle rate may be distributed to the various execution management circuits.

As mentioned previously, the pseudo-random number generator circuit 64 may generate values within a predetermined range. The throttle rate table 90 may be programmed with values in the predetermined range as well. Similar to the credit budget tables 70 and 72, the throttle rate table 90 may be programmed by the operating system at boot of the system and/or may be reprogrammed at other times as desired. The throttle rate table 90 may be implemented as registers, flops, or the like or as a RAM, similar to the discussion above with regard to the credit budget tables 70 and 72.

FIG. 7 is a flowchart illustrating operation of one embodiment of various components of the SOC 10 to implement externally-triggered throttling in the CPU cluster 14. While the blocks are shown in a particular order in FIG. 7, other orders may be used. Blocks may be performed in parallel in combinatorial logic circuitry in the SOC 10. Blocks, combinations of blocks, and/or the flowchart as a whole may be pipelined over multiple clock cycles. The SOC 10, and components thereof, may be configured to implement the operation shown in FIG. 7.

The SOC PMGR 20 may monitor energy consumption in the various components of the SOC 10, and may detect an energy consumption condition corresponding to one of the entries in the energy consumption table (ECT) 24. In response to detecting an energy consumption condition that corresponds to an ECT 24 entry (decision block 110, "yes" leg), the SOC PMGR 20 may read the throttle controls from the entry and asserted the throttle controls to the CPU cluster 14 (block 112). On the other hand, if no energy consumption condition corresponding to any of entries in the ECT 24 is detected (decision block 110, "no" leg), no assertion of the throttle controls is performed. That is, the throttle controls may be deasserted (block 114). The evaluation of the energy conditions and changes in assertion of the throttle controls (blocks 110, 112, and 114) may be performed by the SOC PMGR 20 each clock cycle, or less frequently but periodically, in various embodiments.

Responsive to assertion of the throttle control for the conditional throttle budget to the credit budget circuit 32 (decision block 116, "yes" leg), the credit budget circuit 32 may use the minimum of the credit budget(s) from the throttle budget table 70 and the conditional throttle budget table 72 for the credit budget (block 118). On the other hand, if the throttle control for the conditional throttle budget is deasserted to the credit budget circuit 32 (decision block 116, "no" leg), the credit budget circuit 32 may only use the credit budget(s) from the throttle budget table 70 for the credit budget (block 120).

Responsive to assertion of the throttle control for the throttle rate control to the CPU cluster 14 (decision block 122, "yes" leg), the throttle rate from the throttle rate table 90 may be compared to the pseudo-random numbers generated in the execution management circuits 56A-56B to determine if pipelines 60A-60B should be throttled in the cores 30A-30B (block 124). On the other hand, if the throttle control for the throttle rate control is deasserted to the CPU cluster 14 (decision block 122, "no" leg), the execution management circuits 56A-56B may not attempt throttle rate control, and may throttle based on credits alone (block 126).

Figure 8:
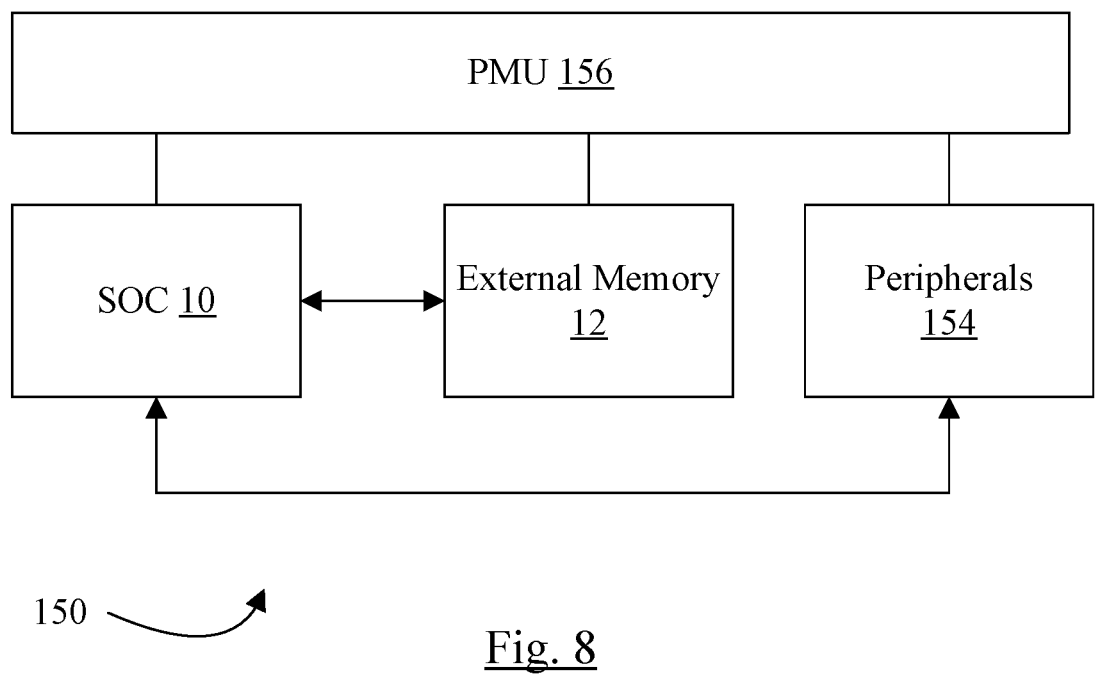
FIG. 8 is a block diagram of one embodiment of a system.

Turning next to FIG. 8, a block diagram of one embodiment of a system 150 is shown. In the illustrated embodiment, the system 150 includes at least one instance of the SOC 10 coupled to one or more peripherals 154 and the external memory 12. The PMU 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The PMU 156 may generally include the circuitry to generate supply voltages and to provide those supply voltages to other components of the system such as the SOC 10, the memory 12, various off-chip peripheral components 154 such as display devices, image sensors, user interface devices, etc. The PMU 156 may thus include programmable voltage regulators, logic to interface to the SOC 10 and more particularly the SOC PMGR 20 to receive voltage requests, etc. The PMU 156 may thus be the power supply protected by the various throttling mechanisms described herein. That is, the limits of the PMU 156 may not be exceeded via the throttling mechanisms discussed above.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. An apparatus comprising:
one or more processor cores, each processor core including a plurality of pipelines;
an energy management circuit coupled to the one or more processor cores, wherein:
the energy management circuit is configured to track energy usage in the one or more processor cores in terms of a number of credits;
the energy management circuit implements a first throttling mechanism configured to throttle instruction issuance to one or more of the plurality of pipelines based on the number of credits and a credit budget for the one or more processor cores;
the energy management circuit is coupled to one or more throttle indications from an external source;
the energy management circuit implements at least one second throttling mechanism that is triggered by the one or more throttling indications;
the first throttling mechanism comprises a first table of credit budgets that is indexed by a first value identifying a first voltage/frequency state of the one or more processor cores to output a first credit budget;
the second throttling mechanism comprises a second table of credit budgets that is indexed by the first value to output a second credit budget; and
the energy management circuit is configured to determine the credit budget based on the first credit budget and the second credit budget.

2. The apparatus as recited in claim 1 wherein the external source is a power manager circuit for a system including the one or more processor cores, wherein the power manager circuit is configured to assert the one or more throttle indications based on energy usage in a remainder of the system.

3. The apparatus as recited in claim 1 wherein the energy management circuit is configured to select a lower one of the first credit budget and the second credit budget as the credit budget for the one or more processor cores responsive to assertion of a first one of the one or more throttle indications received from the external source.

4. The apparatus as recited in claim 3 wherein the energy management circuit is configured to select the first credit budget as the credit budget for the one or more processor cores responsive to deassertion of the first one of the one or more throttle indications received from the external source.

5. The apparatus as recited in claim 1 wherein the first voltage/frequency state is a currently-in-effect state of the one or more processor cores, and wherein a second voltage/frequency state is specified as a target voltage/frequency state to which the one or more processor cores are transitioning, and wherein the first table is indexed by a second value identifying the second voltage/frequency state and a second output of the first table corresponding to the second value is a third credit budget, and wherein the second table is indexed by the second value and a second output of the second table is a fourth credit budget, and wherein the energy management circuit is configured to select a lowest one of the first credit budget, the second credit budget, the third credit budget, and the fourth credit budget as the credit budget for the one or more processor cores responsive to assertion of a first one of the one or more throttle indications received from the external source.

6. The apparatus as recited in claim 5 wherein the energy management circuit is configured to select a lower one of the first credit budget and the third credit budget as the credit budget for the one or more processor cores responsive to deassertion of the first one of the one or more throttle indications received from the external source.

7. The apparatus as recited in claim 1 wherein the second throttling mechanism causes throttling of instruction issuance to the plurality of pipelines for a specified fraction of clock cycles responsive to assertion of a second one of the one or more throttle indications.

8. The apparatus as recited in claim 7 wherein the energy management circuit comprises a plurality of pseudo-random number generator circuits, wherein issuance to a given pipeline of the plurality of pipelines is throttled responsive to a comparison of a value from a respective pseudo-random number generator circuit of the plurality of pseudo-random number generator circuits to a corresponding value generated by the second throttling mechanism.

9. The apparatus as recited in claim 8 wherein the plurality of pseudo-random number generator circuits comprise a plurality of linear feedback shift registers (LFSRs).

10. The apparatus as recited in claim 8 wherein the energy management circuit comprises a table storing a plurality of values corresponding to specified fractions, wherein the table is indexed by the first value, and wherein an output of the table is a first throttle rate, and wherein the first throttle rate is used by the second throttling mechanism as the corresponding value for comparison.

11. The apparatus as recited in claim 10 wherein the first voltage/frequency state is a currently-in-effect state of the one or more processor cores, and wherein a second voltage/frequency state is specified as a target voltage/frequency state to which the one or more processor cores are transitioning, and wherein the table is indexed by a second value identifying the second voltage/frequency state and a second output of the table corresponding to the second value is a second throttle rate, and wherein the energy management circuit is configured to select a higher one of the first throttle rate and the second throttle rate as the corresponding value for the comparison.

12. A system comprising:
one or more components;
a power manager circuit coupled to the one or more components and configured to monitor energy consumption in the one or more components and, responsive to the energy consumption in the one or more components, generate one or more throttle controls;
a processor cluster coupled to the power manager circuit, wherein the processor cluster comprises:
one or more processor cores, each processor core including a plurality of pipelines;
an energy management circuit coupled to the one or more processor cores, wherein:
the energy management circuit is configured to track energy usage in the one or more processor cores in terms of a number of credits;
the energy management circuit is configured to throttle instruction issuance to one or more of the plurality of pipelines based on the number of credits and a credit budget for the one or more processor cores;
the energy management circuit is further configured to throttle instruction issuance to one or more of the plurality of pipelines based on the one or more throttle controls from the power manager circuit;
the energy management circuit comprises a first table of credit budgets that is indexed by a first value identifying a first voltage/frequency state of the one or more processor cores to output a first credit budget;
the energy management circuit comprises a second table of credit budgets that is indexed by the first value to output a second credit budget; and
the energy management circuit is configured to determine the credit budget based on the first credit budget and the second credit budget.

13. The system as recited in claim 12 wherein the energy management circuit is configured to select a lower one of the first credit budget and the second credit budget as the credit budget for the one or more processor cores responsive to assertion of a first throttle control of the one or more throttle controls from the power manager circuit.

14. The system as recited in claim 13 wherein the energy management circuit comprises a plurality of pseudo-random number generator circuits, wherein issuance to a given pipeline of the plurality of pipelines is throttled responsive to a comparison of a value from a respective pseudo-random number generator circuit of the plurality of pseudo-random number generator circuits to a specified value and further responsive to assertion of a second throttle control of the one or more throttle controls from the power manager circuit.

15. The system as recited in claim 14 wherein the energy management circuit comprises a table storing a plurality of values, wherein the table is indexed by the first value identifying the first voltage/frequency state of the one or more processor cores, and wherein an output of the table is a first specified fraction, and wherein the first specified fraction is used as the specified value responsive to the assertion of the second throttle control.

16. An integrated circuit comprising:
one or more components;
a power manager circuit coupled to the one or more components and configured to monitor energy consumption in the one or more components and, responsive to the energy consumption in the one or more components, generate a first throttle control and a second throttle control;
a processor cluster coupled to the power manager circuit, wherein the processor cluster comprises:
one or more processor cores, each processor core including a plurality of pipelines;
an energy management circuit coupled to the one or more processor cores, wherein:
the energy management circuit is configured to throttle instruction issuance to one or more of the plurality of pipelines based on energy usage in the one or more processor cores and a credit budget for the one or more processor cores;
the energy management circuit is configured to determine the credit budget based on a first credit budget read from a first table of credit budgets based on a first voltage/frequency state of the one or more processors cores and a second credit budget read from a second table of credit budgets based on the first voltage/frequency state, wherein the energy management circuit is further configured to determine the credit budget based on the first throttle control from the power manager circuit; and
the energy management circuit is configured to throttle instruction issuance to the plurality of pipelines for a specified fraction of clock cycles responsive to the second throttle control from the power manager circuit.

17. The integrated circuit as recited in claim 16 wherein the specified fraction is determined from a table of throttle rates, responsive to the first voltage/frequency state of the one or more processor cores.

18. The integrated circuit as recited in claim 16 wherein the credit budget is the first credit budget responsive to a deassertion of the first throttle control, and wherein the credit budget is a lower one of the first credit budget and the second credit budget responsive to assertion of the first throttle control.

19. The integrated circuit as recited in claim 16 wherein the energy management circuit comprises a third table storing a plurality of values, wherein the specified fraction is read from the third table based on the first voltage/frequency state.

20. The integrated circuit as recited in claim 19 wherein the energy management circuit comprises a plurality of pseudo-random number generator circuits, wherein issuance to a given pipeline of the plurality of pipelines is throttled responsive to a comparison of a value from a respective pseudo-random number generator circuit of the plurality of pseudo-random number generator circuits to the specified fraction and responsive to the second throttle control.

21. The integrated circuit as recited in claim 16 wherein the first voltage/frequency state is a currently-in-effect state of the one or more processor cores, and wherein a second voltage/frequency state is specified as a target voltage/frequency state to which the one or more processor cores are transitioning, and wherein the first table is indexed by a second value identifying the second voltage/frequency state and a second output of the first table corresponding to the second value is a third credit budget, and wherein the second table is indexed by the second value and a second output of the second table is a fourth credit budget, and wherein the energy management circuit is configured to select a lowest one of the first credit budget, the second credit budget, the third credit budget, and the fourth credit budget as the credit budget for the one or more processor cores responsive to assertion of the first throttle control from the power manager circuit.

* * * * *